(12) United States Patent
Lai

(10) Patent No.: US 8,027,104 B2
(45) Date of Patent: Sep. 27, 2011

(54) LENS MODULE

(75) Inventor: Cheng-Yi Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/728,263

(22) Filed: Mar. 21, 2010

(65) Prior Publication Data

US 2011/0116179 A1    May 19, 2011

(30) Foreign Application Priority Data

Nov. 16, 2009  (CN) .......................... 2009 1 0309777

(51) Int. Cl.
*G02B 7/02*       (2006.01)
*G02B 15/14*      (2006.01)
(52) U.S. Cl. .................... 359/819; 359/823; 359/704
(58) Field of Classification Search .......... 359/694–704, 359/811–824
See application file for complete search history.

(56) References Cited

U.S. PATENT DOCUMENTS

| | | | |
|---|---|---|---|
| 4,527,879 A * | 7/1985 | Hosoe et al. | 396/129 |
| 4,941,010 A * | 7/1990 | Aihara et al. | 396/111 |
| 6,590,721 B2 * | 7/2003 | Onda | 359/819 |
| 7,436,435 B2 * | 10/2008 | Wada | 348/208.4 |

* cited by examiner

*Primary Examiner* — Moahammed Hasan
(74) *Attorney, Agent, or Firm* — Altis Law Group, Inc.

(57) ABSTRACT

A lens module includes a barrel and at least one lens. The barrel defines a through hole bounded by an inner circumference surface thereof. The inner circumference surface includes at least one first circumference latching surface. The at least one lens includes at least one second circumference latching surface corresponding to the at least one first circumference latching surface. One of the first circumference latching surface and the corresponding second circumference latching surface is a ring-shaped concave surface, and the other is a ring-shaped convex surface latchable with the ring-shaped concave surface.

13 Claims, 4 Drawing Sheets

LENS MODULE

BACKGROUND

1. Technical Field

The present disclosure relates to imaging technology and, particularly, to a lens module.

2. Description of Related Art

A typical lens module 40 is shown in FIG. 4. The lens module 40 includes a barrel 41 and a number of lenses 42 received in the barrel 41. Generally, the lenses 42 are fixed in the barrel 41 via adhesive. However, if the adhering strength of the adhesive deteriorates, the imaging quality of the lens module will be prone to be unstable.

What is needed is a lens module to overcome or at least mitigate the above described problem.

BRIEF DESCRIPTION OF THE DRAWINGS

Many aspects of the present lens module can be better understood with reference to the accompanying drawings. The components in the drawings are not necessarily drawn to scale, the emphasis instead being placed upon clearly illustrating the principle of the lens module. In the drawings, all the views are schematic.

DETAILED DESCRIPTION

Embodiments of the present disclosure will be described in detail below, with reference to the accompanying drawings.

Figure 1:
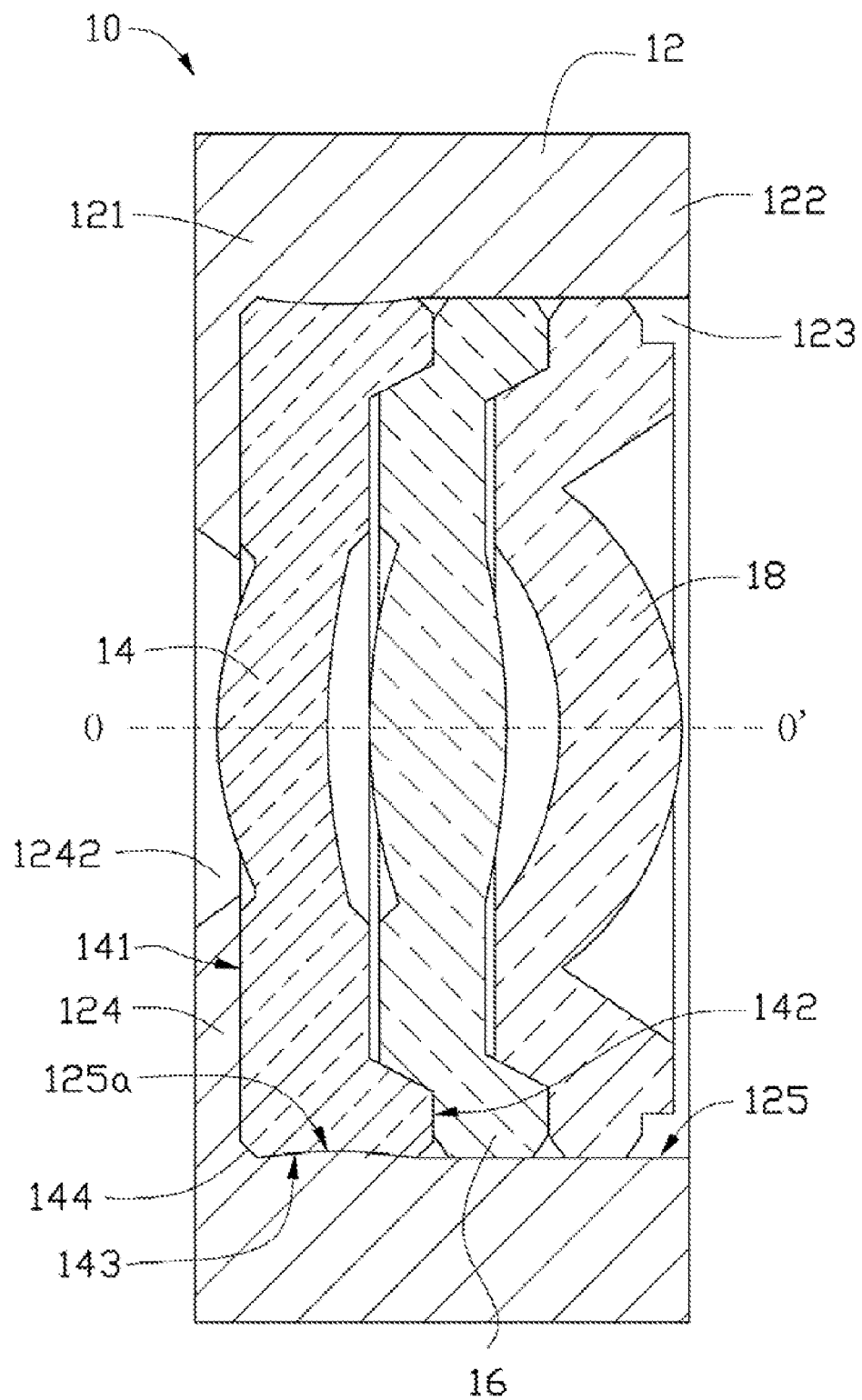
FIG. 1 is a side cross-sectional view of a lens module according to a first exemplary embodiment.

Referring to FIG. 1, a lens module 10, according to a first exemplary embodiment, is shown. The lens module 10 may be used in a camera, a mobile phone, etc. The lens module 10 includes a barrel 12, a first lens 14, a second lens 16, and a third lens 18.

The barrel 12 includes a first end 121 and a second end 122 opposite to the first end 121. The barrel 12 defines a through hole 123 bounded by an inner circumference surface 125, and the through hole 123 extends from the first end 121 to the second end 122. The inner circumference surface 125 includes a first circumference latching surface 125a corresponding to the first lens 14. In the present embodiment, the first circumference latching surface 125a is a ring-shaped convex surface surrounding the first lens 14. The barrel 12 further includes a cap 124 formed at the first end 121 of the barrel 12. The cap 124 defines an opening 1242 at the center thereof. The diameter of the opening 1242 is smaller than that of the through hole 123.

The first lens 14, the second lens 16, and the third lens 18 are received in the through hole 123 of the barrel 12 in the order from the first end 121 to the second end 122 of the barrel 12. The first lens 14 includes a first end surface 141, a second end surface 142, and a second circumference latching surface 143 connecting the first end surface 141 to the second end surface 142. In the present embodiment, the first end surface 141 of the first lens 14 resists the cap 124. The second end surface 142 of the first lens 14 resists the second lens 16. The second circumference latching surface 143 is a ring-shaped concave surface, which fits the first circumference latching surface 125a of the inner circumference surface 125 of the barrel 12. The first lens 14 is prevented from moving along the optical axis OO' of the lens module 10 by means of the second circumference latching surface 143 thereof, which latches with the first circumference latching surface 125a of the inner circumference surface 125 of the barrel 12. The first lens 14 further defines two chamferings 144 on the first end surface 141 and the second end surface 142, respectively, thus, the first lens 14 can be inserted into the barrel 12 more easily.

It should be understood, the number of lenses of the lens module 10 is not limited to the present embodiment, the number of the lenses of the lens module 10 can also be one, two, four or more.

When assembling the lens module 10, because the second circumference latching surface 143 of the first lens 14 is capable of latching with the first circumference latching surface 125a of the inner circumference surface 125 of the barrel 12, the first lens 14 can be fixed in the barrel 10 conveniently only by inserting the first lens 14 into the through hole 123 of the barrel 12.

Figure 2:
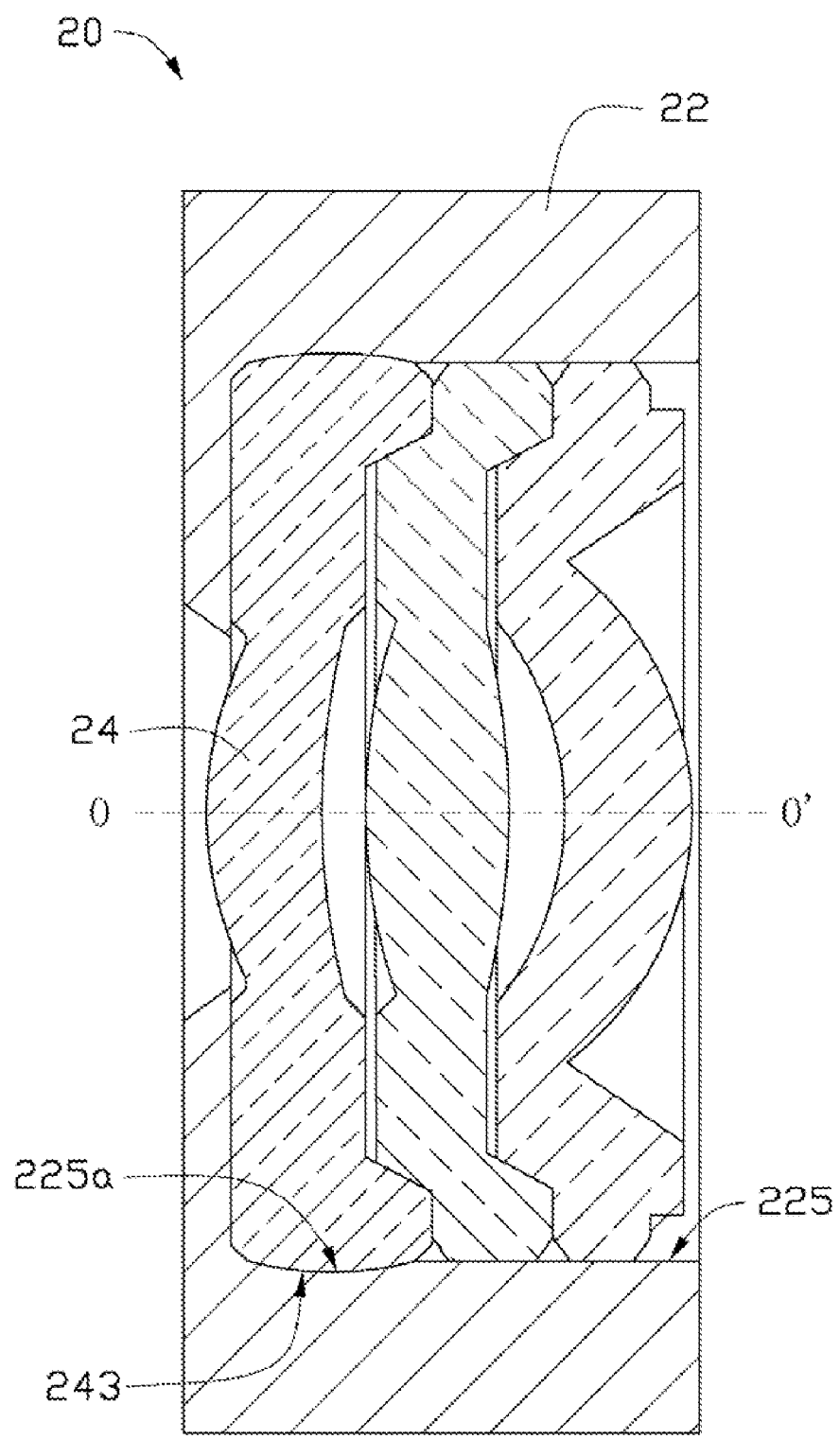
FIG. 2 is a side cross-sectional view of a lens module according to a second exemplary embodiment.

Referring to FIG. 2, a lens module 20 according to a second exemplary embodiment is shown. The lens module 20 includes a barrel 22 and a first lens 24. The lens module 20 is similar to the lens module 10 of the first exemplary embodiment. A second circumference latching surface 243 of the first lens 24 is a ring-shaped convex surface. A first circumference latching surface 225a of an inner circumference surface 225 of the barrel 22 corresponding to the first lens 24 is a ring-shaped concave surface, which fits the second circumference latching surface 243.

Figure 3:
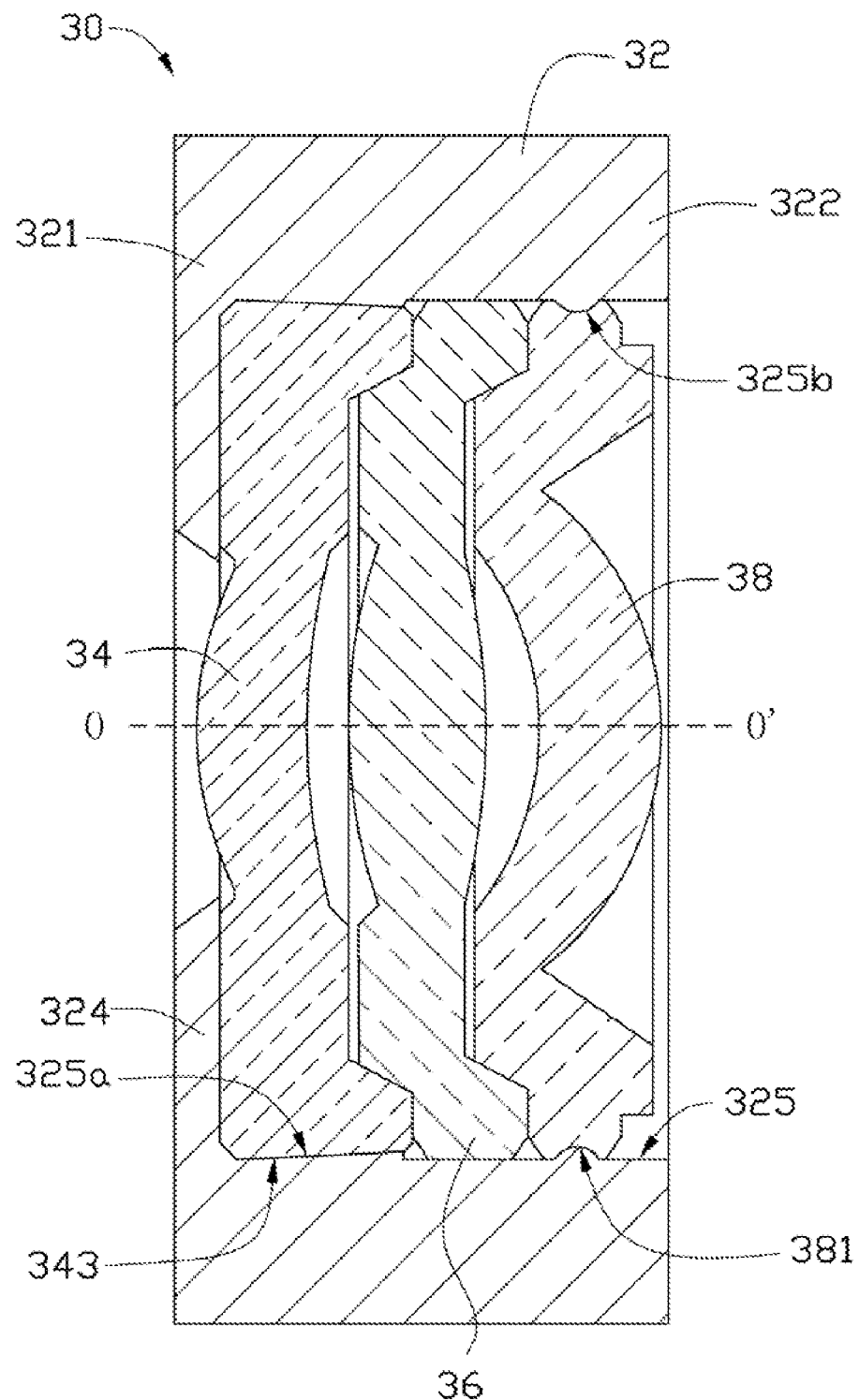
FIG. 3 is a side cross-sectional view of a lens module according to a third exemplary embodiment.
Figure 4:
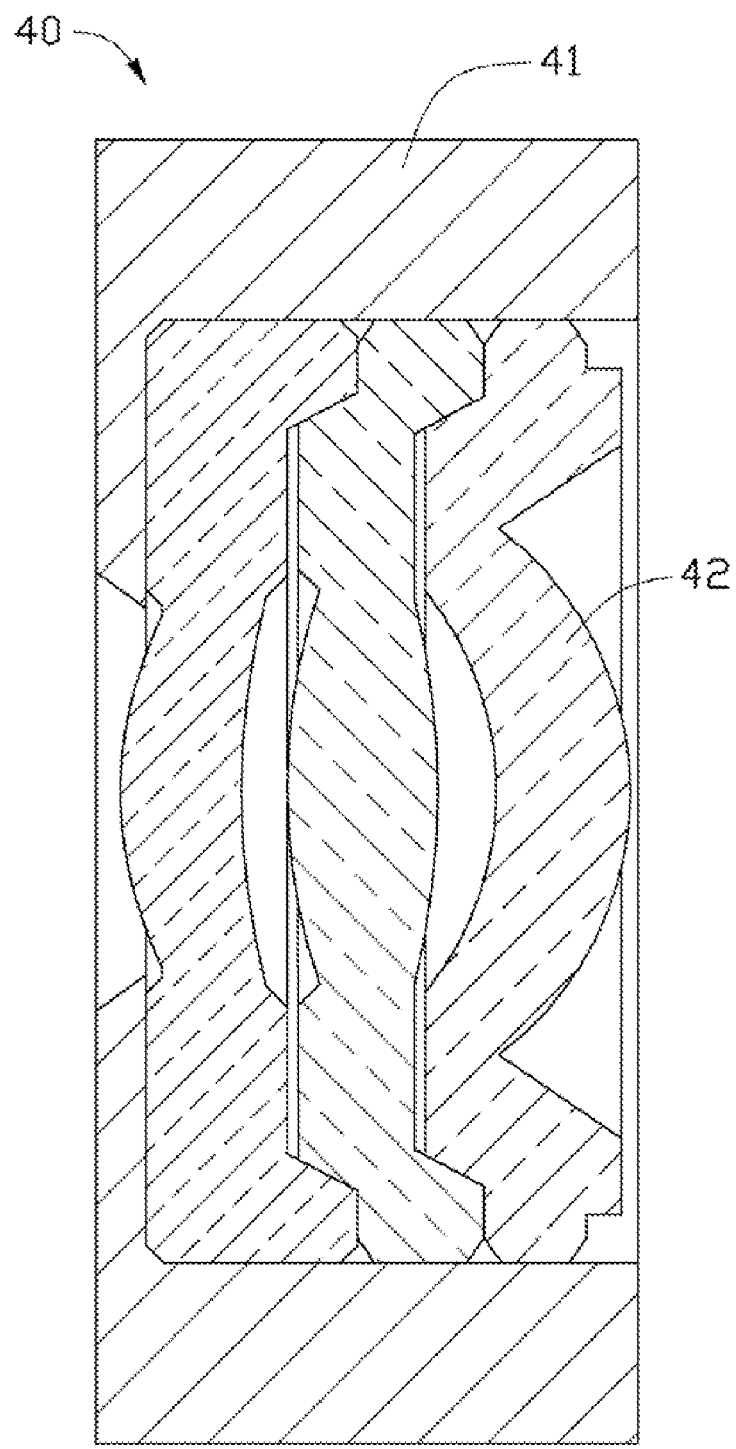
FIG. 4 is a side cross-sectional view of a lens module according to a related art.

Referring to FIG. 3, a lens module 30 according to a third exemplary embodiment is shown. The lens module 30 includes a barrel 32, a first lens 34, a second lens 36, and a third lens 38. The barrel 32 includes a first end 321 and a second end 322, and includes a cap 324 at the first end 321. The first lens 34, the second lens 36, and the third lens 38 are received in the barrel 32 in the order from the first end 321 to the second end 322. Each of the first lens 34, the second lens 36, and the third lens 38 contacts with adjacent lens/lenses. The lens module 30 is similar to the lens module 10 of the first exemplary embodiment. Differing from the lens module 10, the lens module 30 has a circumference surface 343 of the first lens 34 which is tapered from the first end 121 towards the second end 122, and an inner circumference surface 325 of the barrel 32 includes a tapered surface 325a which fits the circumference surface 343 of the first lens 34. Furthermore, the third lens 38 includes a second circumference latching surface 381, and the inner circumference surface 325 of the barrel 32 includes a first circumference latching surface 325b. The first circumference latching surface 325b is a ring-shaped convex surface, and the second circumference latching surface 381 is a ring-shaped concave surface. In the lens module 30, the second lens 36 can be fixed in the barrel 32 by being sandwiched between the third lens 38 and first lens 34.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope and spirit of the appended claims.

What is claimed is:

1. A lens module comprising:
    a barrel comprising a first end, a second end opposite to the first end, and a cap formed at the first end, and defining a through hole bounded by an inner circumference surface thereof, the inner circumference surface substantially parallel to an optical axis of the lens module, and the inner circumference surface comprising at least one first circumference latching surface, the through hole extending from the first end to the second end, the cap defining an opening at the center thereof, and the diameter of the opening being smaller than that of the through hole; and at least one lens received in the barrel, the at least one lens comprising at least one second circumference latching surface, the at least one first circumference latching surface of the barrel surroundingly latching the at least one second circumference latching surface of the at least one lens, wherein, one of the at least one first circumference latching surface and the corresponding at least one second circumference latching surface is a ring-shaped concave surface, and the other is a ring-shaped convex surface latchable with the corresponding ring-shaped concave surface.

2. The lens module as claimed in claim 1, wherein the at least one lens defines two chamferings on two end surfaces thereof, respectively, and each chamfering is connected to a corresponding at least one second circumference latching surface.

3. The lens module as claimed in claim 1, wherein the at least one lens comprises a plurality of lenses, the lens nearest to the first end of the barrel comprises a circumference surface which is tapered from the first end towards the second end of the barrel, and the inner circumference surface of the barrel comprises a tapered surface fitting the circumference surface of the lens nearest to the first end of the barrel.

4. The lens module as claimed in claim 3, wherein the lens nearest to the first end of the barrel comprises an end surface facing the cap and resisting the cap.

5. The lens module as claimed in claim 1, wherein the at least one lens comprises a plurality of lenses, the lens nearest to the second end of the barrel comprises the at least one second circumference latching surface, and the at least one first circumference latching surface of the inner circumference surface of the barrel latches with the at least one second circumference latching surface of the lens nearest to the second end of the barrel.

6. The lens module as claimed in claim 1, wherein the at least one first circumference latching surface is a ring-shaped convex surface, and the at least one second circumference latching surface is a ring-shaped concave surface.

7. The lens module as claimed in claim 1, wherein the at least one first circumference latching surface is a ring-shaped concave surface, and the at least one second circumference latching surface is a ring-shaped convex surface.

8. A lens module comprising:

a hollow barrel comprising a first end, a second end opposite to the first end, and a cap formed at the first end and defining a through hole bounded by an inner wall of the barrel, the inner wall comprising a latching portion, the latching portion being generally cylindrical, the through hole extending from the first end to the second end, the cap defining an opening at the center thereof, and the diameter of the opening being smaller than that of the through hole; and a lens received in the barrel at the latching portion, an outer periphery of the lens being generally cylindrical;

wherein one of the latching portion and the outer periphery of the lens is in the form of an annular bead with a curved surface, and the other of the latching portion and the outer periphery of the lens is in the form of an annular depression with a curved surface matching the curved surface of the bead, such that the lens is latched in the latching portion.

9. The lens module as claimed in claim 8, wherein the latching portion is in the form of the annular bead with the curved surface, and the outer periphery of the lens is in the form of the annular depression with the curved surface.

10. The lens module as claimed in claim 8, wherein the latching portion is in the form of the annular depression with the curved surface, and the outer periphery of the lens is in the form of the annular bead with the curved surface.

11. A lens module comprising:

a hollow barrel comprising a first end, a second end opposite to the first end, and a cap formed at the first end and defining a through hole bounded by an inner wall of the barrel, the inner wall comprising a latching portion, a surface of the latching portion being generally cylindrical, the through hole extending from the first end to the second end, the cap defining an opening at the center thereof, and the diameter of the opening being smaller than that of the through hole; and a lens received in the barrel at the latching portion, an outer surface of the lens being generally cylindrical;

wherein a transverse cross-section of one of the surface of the latching portion and the outer surface of the lens is a curved bulge, and a transverse cross-section of the other of the surface of the latching portion and the outer surface of the lens defines a curved recess matching the curved bulge, such that the lens is latched in the latching portion.

12. The lens module as claimed in claim 11, wherein the transverse cross-section of the surface of the latching portion is the curved bulge, and the transverse cross-section of the outer surface of the lens defines the curved recess.

13. The lens module as claimed in claim 11, wherein the transverse cross-section of the surface of the latching portion defines the curved recess, and the transverse cross-section of the outer surface of the lens is the curved bulge.

* * * * *